Jan. 10, 1956

H. M. McCULLOUGH 2,730,260

SEALING ALLOY FOR SOFT GLASS

Filed Sept. 26, 1952

INVENTOR
HAROLD M. MC CULLOUGH
BY
ATTORNEY

United States Patent Office 2,730,260
Patented Jan. 10, 1956

2,730,260

SEALING ALLOY FOR SOFT GLASS

Harold M. McCullough, Seaford, N. Y., assignor to Sylvania Electric Products Inc., a corporation of Massachusetts Application September 26, 1952, Serial No. 311,591

3 Claims. (Cl. 220—2.3)

This invention relates to a glass sealing alloy. More particularly, it relates to an alloy which is capable of being sealed into soft glass bodies in a vacuum type manner.

Many alloys suitable for sealing to glass have been developed and are known to the prior art. Amongst them is a nickel iron chromium alloy which has been found to be effective in making a vacuum tight seal to soft glass such as is used in radio tubes. This alloy which comprises approximately 4–8% chromium, 42% nickel and the balance substantially entirely iron has been described in Patent Number 2,394,919. However, in order to use this alloy successfully in making these glass to metal seals the surface of it must first be oxidized and due to the high temperatures involved in its oxidation the furnaces and muffles in which said oxidation is carried out deteriorate quite rapidly.

It is, accordingly, an object of this invention to modify this alloy in such manner that the oxidizing temperature can be lowered considerably and yet maintain all the oxide conditions satisfactorily for sealing the alloy to soft glass.

It is a further object of this invention to provide an alloy of this character which upon oxidation at the lower temperatures will have an adherent oxide coating which will remain bonded to the metal during all normal processing of a glass to metal seal.

A further object of this invention is to provide an alloy which will have low electrical resistance to permit spot welding.

A still further object of this invention is to provide an alloy which can be readily worked and drawn to wire.

In the drawings which illustrate the characteristics of an alloy of this invention.

In accordance with this invention it has been found that when small amounts of titanium are added to the nickel iron chromium alloy described in the afore-mentioned patent an alloy is obtained which will give a satisfactory sealing oxide which can be formed at temperatures well below those needed for the alloy without these additions. Furthermore, this alloy will have a coefficient of thermal expansion between the range 88 and 98×10⁻⁷ micro. in. per in. between the temperatures of 25–400° C.

Figures 2, 3:
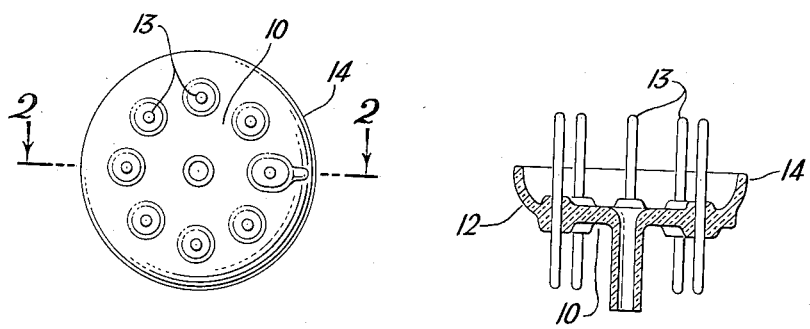
Fig. 2 is a cross sectional view of an electron tube header embodying features of the invention.
Fig. 3 is a bottom view of Fig. 2.

Alloys of this type can readily be used for example in the manufacture of electron discharge tubes where it is necessary to provide a vacuum tight glass to metal seal which seal will remain vacuum tight over long periods and over relatively wide temperature ranges. These alloys are specifically suitable for use in the manufacture of metal parts in which the glass to metal seal is to be rigid as, for example, in a radio tube header disclosed in U. S. Patent 2,338,538 and shown in Figs. 2 and 3 of the drawings, wherein a radio tube header is shown consisting of a glass button-like member 10, having a smoothly curved rim 12 which terminates in a substantially cylindrical lip 14. The bottom portion of the member 10 is preferably formed of a soft grade glass such as Corning G 12 which has the following composition:

| | Per cent |
|---|---|
| SiO₂ | 63.1 |
| PbO | 20.2 |
| Al₂O₃ | 0.28 |
| CaO | 0.94 |
| Na₂O | 7.6 |
| K₂O | 5.5 |
| Mn₂O₃ | 0.88 |

Figure 1:
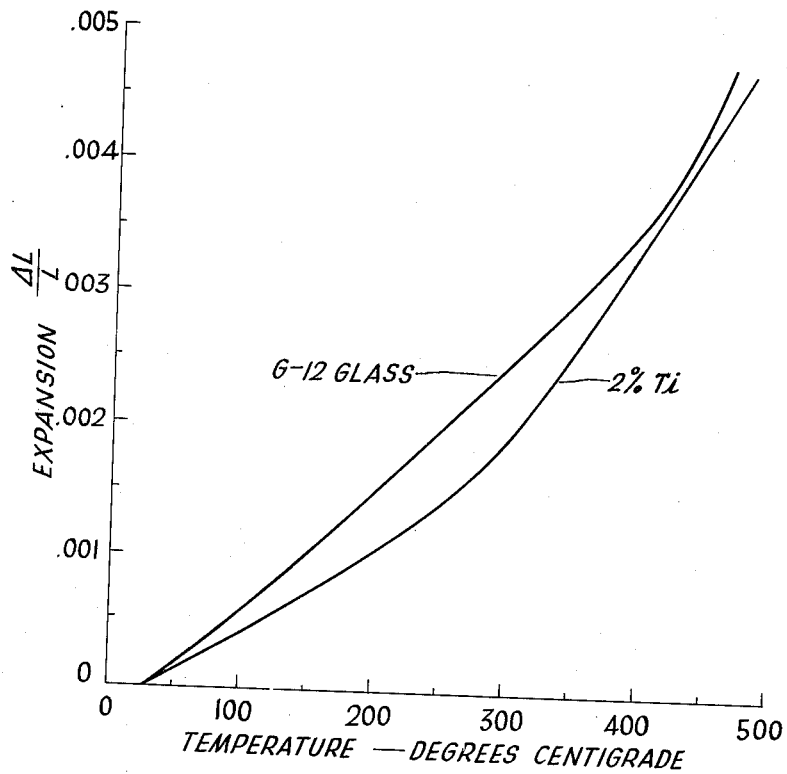
Fig. 1 shows the thermal expansion curves of an alloy of this invention as compared with a soft glass.

Sealed through member 10 are a plurality of rigid metal rods 13 which extend outwardly to form rigid contact prongs for the radio tube to which the header is sealed. The prongs 13 are preferably formed of the alloy of this invention consisting of approximately 42% nickel, 4 to 8% chromium; 1–3% titanium and the balance substantially of iron. Of these constituents, the nickel, chromium and iron give the metal the desired thermal coefficient of expansion and the necessary oxide conditions for sealing the alloy to glass. The titanium content seems to influence the alloys characteristic in making it more readily oxidizable. Very excellent results have been obtained with alloys which fall within the above range and have been oxidized at temperatures as low as 1400° F. With these alloys it has been possible to make vacuum seals which were 100% good when tested two months after the sealing operation had taken place. One of the compositions which may be said to be preferred is one which the nickel content is 42%, the titanium is 2%, the chromium content 4% and the balance essentially iron. The curve for the alloy is shown in Fig. 1 of the drawings.

While the above description submitted herewith discloses a preferred and practical embodiment of the alloy of this invention it will be understood by the specific details of construction and arrangement of parts described are by way of illustration and are not to be construed as limiting the scope of the invention.

What is claimed is:

1. In an electron discharge device having a glass envelope and a metallic member sealed through said envelope in a vacuum tight manner, said metallic member consisting of an alloy comprising approximately 42% nickel, 4 to 8% chromium, 1 to 3% titanium and the balance substantially entirely iron.

2. In an electron discharge device having a glass envelope and a metallic member sealed through said envelope in a vacuum tight manner, said metallic member consisting of an alloy comprising 42% nickel, 4% chromium, 2% titanium and the balance substantially entirely iron.

3. In an electron discharge device having a glass envelope and a metallic member sealed through said envelope in a vacuum tight manner, said metallic member consisting of an alloy consisting essentially of 42% nickel, 4 to 8% chromium, 2% titanium and the balance substantially entirely iron.

References Cited in the file of this patent

UNITED STATES PATENTS

| 2,266,482 | Pilling et al. | Dec. 16, 1941 |
| 2,284,151 | Kingston | May 26, 1942 |
| 2,292,026 | Gillett | Aug. 4, 1942 |